United States Patent
Day

(10) Patent No.: US 9,526,230 B2
(45) Date of Patent: Dec. 27, 2016

(54) PET TOY

(71) Applicant: Zigoo LLC, West Chester, OH (US)

(72) Inventor: Steven Z. Day, Cincinnati, OH (US)

(73) Assignee: Zigoo LLC, West Harrison, IN (US)

(*) Notice: Subject to any disclaimer, the term of this patent is extended or adjusted under 35 U.S.C. 154(b) by 0 days.

(21) Appl. No.: 14/261,503

(22) Filed: Apr. 25, 2014

(65) Prior Publication Data

US 2014/0318472 A1 Oct. 30, 2014

Related U.S. Application Data

(60) Provisional application No. 61/816,138, filed on Apr. 25, 2013.

(51) Int. Cl.
*A01K 15/02* (2006.01)
*A01K 11/00* (2006.01)

(52) U.S. Cl.
CPC .......... *A01K 15/025* (2013.01); *A01K 15/026* (2013.01)

(58) Field of Classification Search
CPC ...... A63B 2208/12; A63H 3/04; A01K 15/025
USPC ........ 119/707, 702, 708, 709, 710; D30/160
See application file for complete search history.

(56) References Cited

U.S. PATENT DOCUMENTS

| | | | |
|---|---|---|---|
| 1,006,182 A | 10/1911 | Cousin | |
| 2,464,665 A * | 3/1949 | Anderson | 446/227 |
| 2,718,873 A * | 9/1955 | Buckner | 119/711 |
| 3,062,370 A | 11/1962 | Morin | |
| 3,283,894 A | 11/1966 | Hafner et al. | |
| 3,410,023 A * | 11/1968 | Anello | A63H 33/00 446/353 |
| D234,790 S * | 4/1975 | Rosenberg | D30/160 |
| D238,437 S * | 1/1976 | Rosenberg | D30/160 |
| 4,078,792 A | 3/1978 | Arato | |
| 4,219,959 A * | 9/1980 | Fleischer | 446/486 |
| 4,505,687 A * | 3/1985 | Munro | 446/368 |
| 4,595,369 A * | 6/1986 | Downs | 434/302 |
| 4,724,548 A * | 2/1988 | London | A41F 9/002 2/170 |
| 4,742,799 A | 5/1988 | Schlitz | |
| 4,884,717 A | 12/1989 | Bussard et al. | |
| 4,957,300 A * | 9/1990 | Storry | 473/569 |
| 5,249,337 A | 10/1993 | Cross et al. | |
| 5,338,242 A | 8/1994 | Cheng | |
| D353,235 S * | 12/1994 | D'Angelico | D30/160 |
| D360,712 S | 7/1995 | Bush | |
| 5,460,368 A * | 10/1995 | Pearson | 473/597 |
| 5,584,434 A * | 12/1996 | Lipson | 239/33 |

(Continued)

OTHER PUBLICATIONS

Chuckit! Floppy Tug™-HD, Petmatepetproducts, Mar. 25, 2014, video downloaded at http://www.youtube.com/watch?v=szpvuOm6BEQ.

(Continued)

*Primary Examiner* — Yvonne Abbott-Lewis
(74) *Attorney, Agent, or Firm* — Frost Brown Todd LLC

(57) ABSTRACT

A pet toy is constructed of a resilient material that stretches and returns to its original shape when at rest. The toy further has a spiral, coiled, or wound shape that channels or directs stretch in a particular direction. The toy has stretch or shape-changing ability and can change in length by one and one-half times or more. In some instances an object can be used with the toy and be retained within an interior space of the toy.

16 Claims, 6 Drawing Sheets

(56) References Cited

U.S. PATENT DOCUMENTS

| | | |
|---|---|---|
| 5,595,142 A | 1/1997 | Chill |
| 5,803,785 A | 9/1998 | Primos, Jr. et al. |
| 5,813,366 A | 9/1998 | Mauldin, Jr. |
| 5,832,877 A | 11/1998 | Markham |
| 5,865,146 A | 2/1999 | Markham |
| 5,921,204 A | 7/1999 | Johnson |
| 5,935,628 A | 8/1999 | Hauser et al. |
| 5,957,082 A | 9/1999 | Budman et al. |
| 5,984,884 A | 11/1999 | Alvarez et al. |
| 6,112,703 A | 9/2000 | Handelsman |
| D432,453 S * | 10/2000 | Franzen ............... D11/131 |
| 6,158,391 A | 12/2000 | Simonetti |
| 6,168,496 B1 * | 1/2001 | Thomas ............ A63H 3/02 112/63 |
| 6,186,096 B1 | 2/2001 | Miller |
| 6,405,681 B1 | 6/2002 | Ward |
| 6,918,355 B1 | 7/2005 | Arvanites |
| 6,990,762 B1 | 1/2006 | Muday et al. |
| D523,191 S * | 6/2006 | Wang ..................... D30/160 |
| 7,089,878 B2 * | 8/2006 | Huang .................... 116/63 C |
| 7,175,069 B1 | 2/2007 | Tsengas |
| 7,389,748 B2 | 6/2008 | Shatoff et al. |
| 7,500,450 B2 | 3/2009 | Wolfe et al. |
| 7,506,614 B1 | 3/2009 | Tsengas |
| 7,509,924 B2 | 3/2009 | Luo |
| 7,536,978 B2 | 5/2009 | Washington et al. |
| 7,555,997 B2 | 7/2009 | Wolfe et al. |
| 7,587,993 B2 | 9/2009 | Jager |
| 7,600,488 B2 | 10/2009 | Mann |
| 7,766,168 B2 | 8/2010 | Thrapp et al. |
| D625,056 S | 10/2010 | Kelly |
| D629,978 S | 12/2010 | Nazimek |
| 7,997,229 B2 | 8/2011 | Saborio et al. |
| 8,033,253 B2 | 10/2011 | Ritchey et al. |
| 8,087,387 B2 | 1/2012 | Gamble et al. |
| 8,225,747 B2 | 7/2012 | Markham et al. |
| D665,136 S | 8/2012 | Day |
| 8,240,275 B2 | 8/2012 | Ragonetti et al. |
| 8,261,953 B2 | 9/2012 | McSavaney |
| 8,322,308 B2 | 12/2012 | Curry et al. |
| 8,516,977 B2 | 8/2013 | Shatoff et al. |
| 8,523,628 B2 | 9/2013 | Rutherford et al. |
| 8,695,829 B2 | 4/2014 | Krueger et al. |
| D705,499 S * | 5/2014 | Zamarripa ............. D30/124 |
| 8,904,959 B2 * | 12/2014 | Lush ..................... 119/51.01 |
| 8,978,590 B2 | 3/2015 | Nunn et al. |
| 9,107,390 B1 | 8/2015 | Day |
| 2007/0022971 A1 | 2/2007 | Renforth et al. |
| 2008/0083378 A1 | 4/2008 | Pearce |
| 2008/0121190 A1 | 5/2008 | Moulton |
| 2008/0141948 A1 | 6/2008 | Renforth et al. |
| 2009/0025648 A1 | 1/2009 | Simon |
| 2009/0078214 A1 | 3/2009 | Mann |
| 2009/0211537 A1 | 8/2009 | Bertsch et al. |
| 2011/0017148 A1 | 1/2011 | Tsengas |
| 2011/0192353 A1 | 8/2011 | Willinger et al. |
| 2011/0265732 A1 | 11/2011 | Lai |
| 2011/0277696 A1 | 11/2011 | Rutherford et al. |

OTHER PUBLICATIONS

Doggy Hoots Water Bottle Crunchers Dog Toy, Petco (Apr. 26, 2010), http://www.petco.com/product/109878/Doggy-Hoots-Water-Bottle-Crunchers-Dog-Toy, printed Sep. 15, 2011.
Kong Classic, Kong, http://www.kongcompany.com/products/dogs/kong-rubber-toys/classic/kong-classic, printed Sep. 14, 2011.
Water Bottle Buddies Dog Toy, dog.com.
U.S. Appl. No. 13/559,046.
U.S. Appl. No. 14/741,434.
U.S. Appl. No. 14/742,114.
U.S. Appl. No. 14/798,524.

* cited by examiner

PET TOY

PRIORITY

This application claims priority to U.S. Provisional Patent Application Ser. No. 61/816,138, filed Apr. 25, 2013 entitled "Pet Toy," the disclosure of which is incorporated by reference herein.

BACKGROUND

A wide variety of pet toys exist in the marketplace. Some pet toys comprise an object to chew, or an object to throw and retrieve, or an object that makes noise, or an object that is visually of interest to the pet, among other things. While a variety of pet toys have been made and used, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements.

Figure 1:
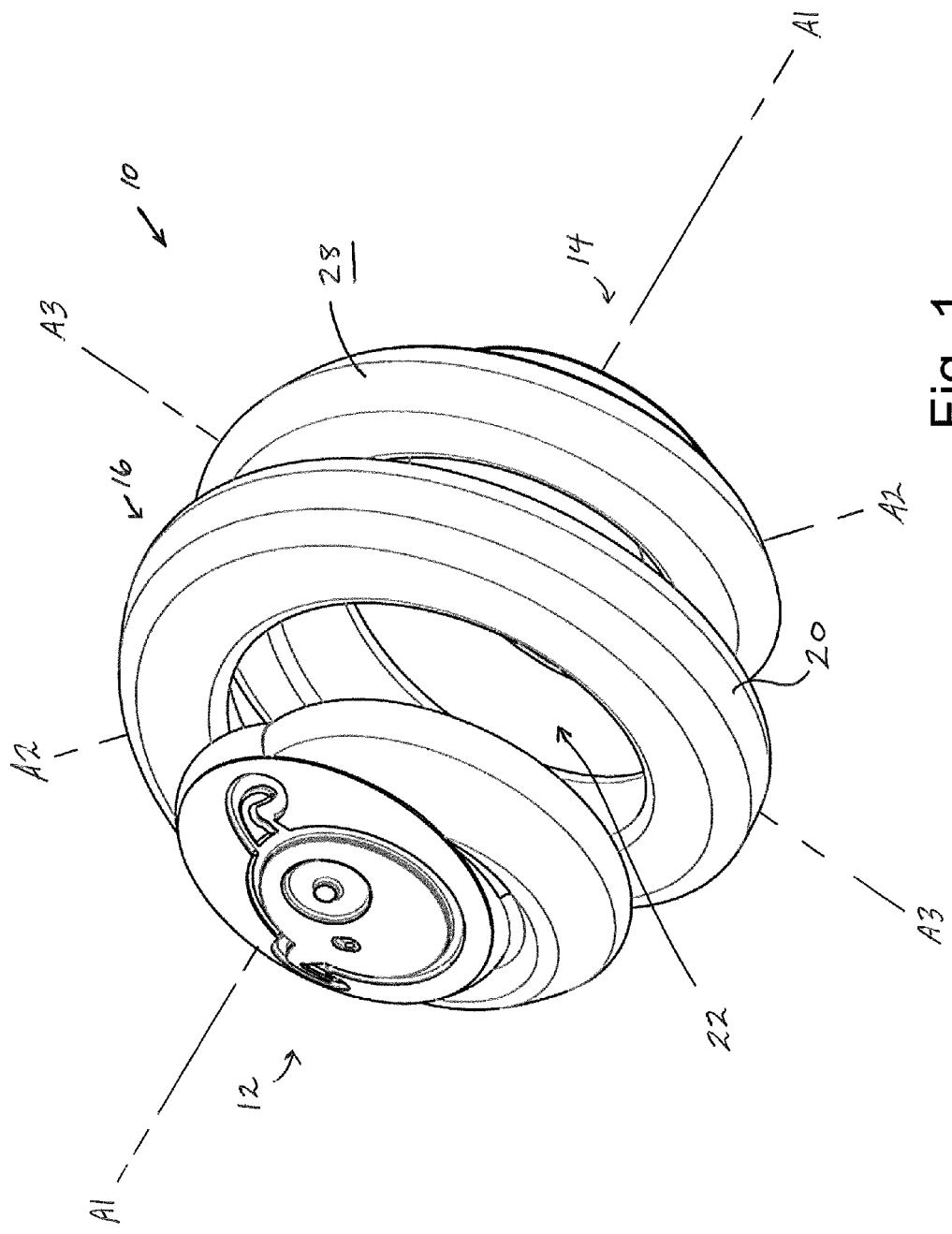
FIG. 1 depicts a perspective view of an exemplary pet toy.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description. As will be realized, the invention is capable of other different aspects without departing from the invention. Accordingly, the drawings and descriptions should be regarded as illustrative in nature and not restrictive.

FIGS. 1-6 illustrate exemplary pet toys (10). In some versions pet toys (10) are used as a toy for a dog, while in other versions pet toys (10) can be used as a toy for another type of pet. Throughout this disclosure, pet toys (10) may be referred to as dog toys (10) or merely toys (10), and these terms should be considered synonymous, it being understood however that dog toys (10) can be used as a toy for other types of pets in addition to or in lieu of dogs.

Referring to FIGS. 1-4, toy (10) comprises a generally spherical shape that can be somewhat extended to be more egg-shaped than perfectly spherical. Thus toy (10) can be spherical in some versions, and in other versions toy (10) can have a prolate ellipsoid (similar to an egg shape or American football shape) or oblate ellipsoid shape. In some versions toy (10) is not required to be symmetrical about a transverse axis, for instance when having an egg shape. In view of the teachings herein, other shapes for toy (10) will be apparent to those of ordinary skill in the art.

Figure 2:
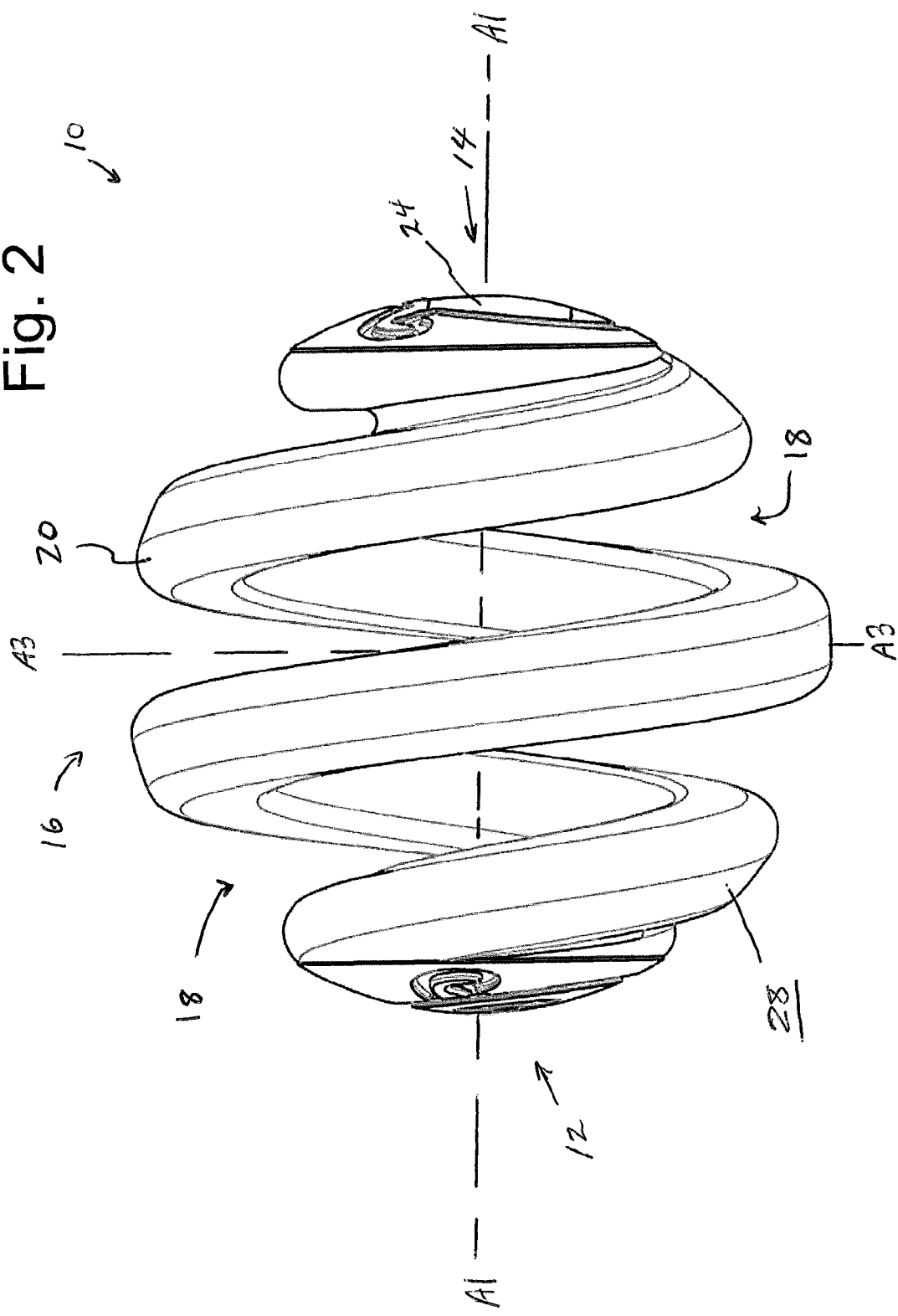
FIG. 2 depicts a front view of the pet toy of FIG. 1.
Figure 3:
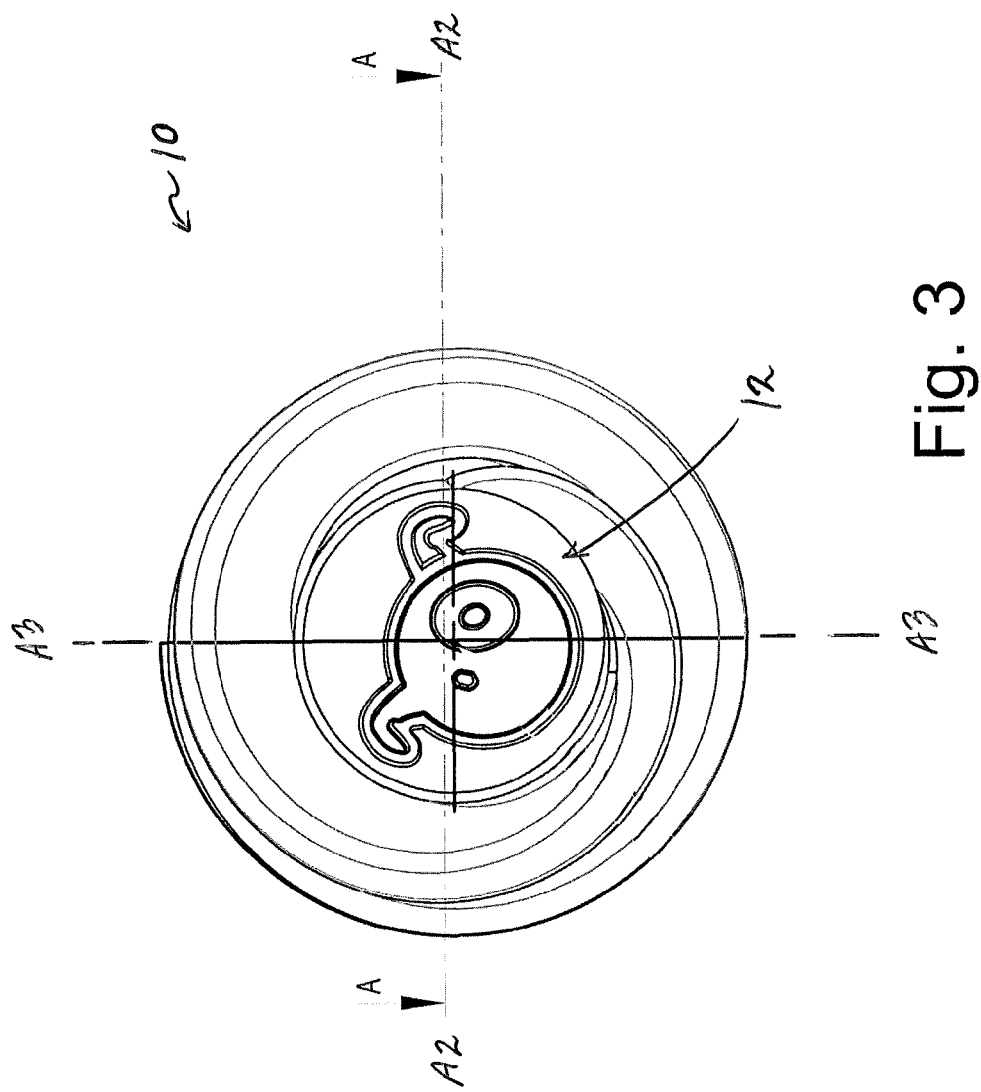
FIG. 3 depicts a side view of the pet toy of FIG. 1.

Toy (10) comprises a first end (12), a second end (14), and a middle portion (16) extending between first end (12) and second end (14). Toy (10) can be understood as having a length that runs from first end (12) to second end (14) and a width that runs in an opposite direction, perpendicular to the length. Toy (10) can also be understood as having a height that is also perpendicular to the length, while also being perpendicular to the width. As shown in FIGS. 1-3, axis A1 represents the length dimension, axis A2 represents the width dimension, and axis A3 represents the height direction.

Toy (10) is formed from a body or elongated member (20) that extends from first end (12) through middle portion (16) to second end (14) in a spiral or coiled configuration. Toy (10) is configured with an interior space (22), and middle portion (16) contains spaces or openings (18) that provide access to interior space (22). In the illustrated version the spaces or openings (18) have an equal width across the length of toy (10) from first end (12) to second end (14), but this equal width is not required in all versions. In other versions, other numbers of and sizes of spaces or openings (18) can be used that will be apparent to one of ordinary skill in the art in view of the teachings herein.

In one version, the outer diameter of a generally spherical shaped toy (10) at its widest point is about 4.5 inches. Furthermore, elongated member (20) extends from first end (12) to second end (14) and is about 0.6 inches in diameter or width along middle portion (16). At first end (12) and second end (14), in the present example, elongated member (20) flattens-out and has a larger diameter or width compared to the diameter or width of elongated member (20) along middle portion (16). In one version, elongated member (20) tapers slightly as it extends from first end (12) along middle portion (16) until reaching second end (14). In some other versions, elongated member (20) has a consistent diameter or width along middle portion (16) with the dimensions at first end (12) and second end (14) being substantially the same.

In the illustrated versions, first end (12) and second end (14) have a round or circular shape. In other versions, other shapes for first end (12) and second end (14) can be used, and such other shapes will be apparent to one of ordinary skill in the art in view of the teachings herein. For example, first end (12) and/or second end (14) in alternate versions could have a square shape, rectangular shape, triangular shape, among others.

Figure 4:
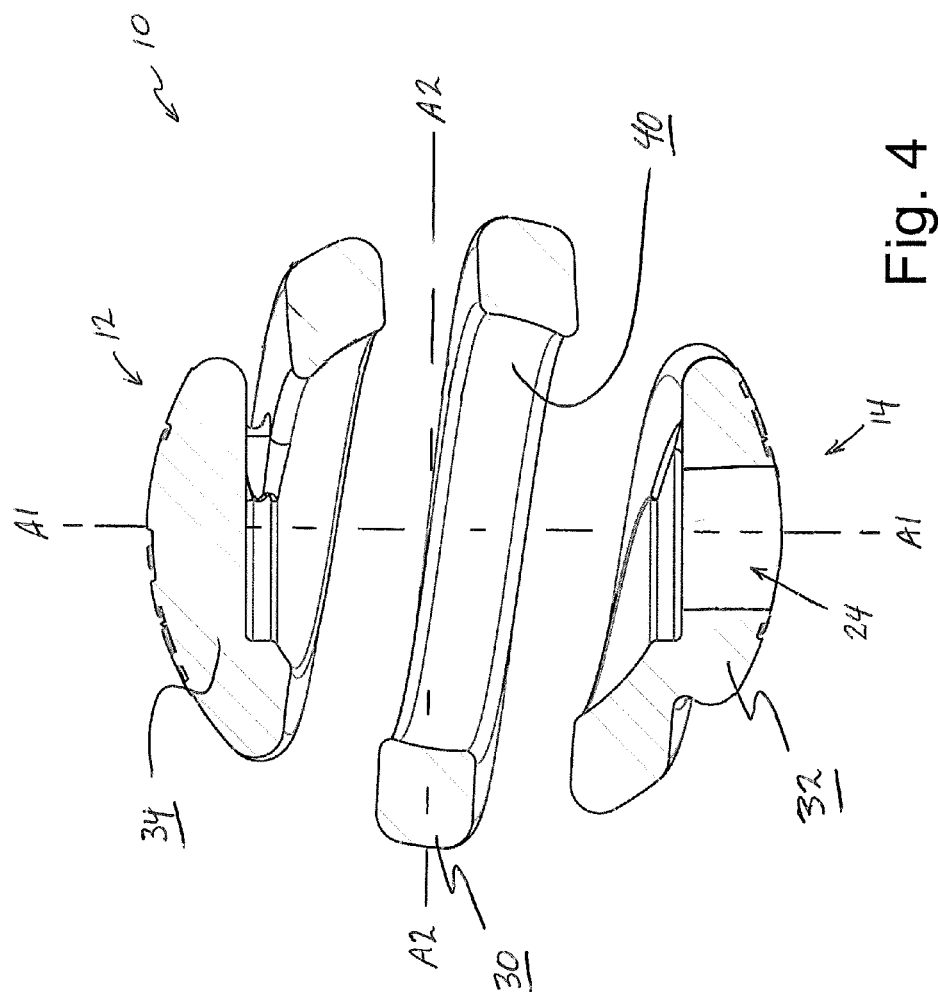
FIG. 4 depicts a cross section view taken along line A-A of FIG. 3.

In some versions, an object, e.g. a water bottle or other chew article, can be fit within interior space (22), such that toy (10) is configured to hold or retain an article or item. In such versions, opening (24) at second end (14) as shown in FIGS. 2 and 4 can be used to provide a location for pushing or ejecting the object out of interior space (22) of toy (10), where the object would emerge or exit interior space (22) from one of openings (18).

Elongated member (20) of toy (10) comprises outer surface (28). In the present example, outer surface (28) comprises a texture. The texture used for outer surface (28)

can be rough, smooth, raised, embossed, grooved, etc. Other texture configurations will be apparent to those of ordinary skill in the art in view of the teachings herein. Outer surface (28) generally defines the shape or perimeter of toy (10). Elongated member (20) further comprises interior surface (40) as shown in FIG. 4. Interior surface (40) generally defines the shape or perimeter of interior space (22). Interior surface (40) can also comprise a texture that could be the same or different than the texture of outer surface (28). Exemplary textures for interior surface (40) include but are not limited to those listed with respect to outer surface (28). In one example, toy (10) can have outer surface (28) with a smooth texture that makes it more difficult for a pet to grip toy (10). At the same time, interior surface (40) can have a rough texture that can provide better gripping power for when an object (36) is retained within interior space (22) of toy (10). Other texture combinations will be apparent to those of ordinary skill in the art in view of the teachings herein.

Interior space (22), in the present example, comprises a three-dimensional shape, e.g. a spherical shape in some versions. In cross section as shown in FIG. 4, interior space (22) has a generally circular shape with a slightly increasing diameter along the length of toy (10) when moving from near first end (12) to middle portion (16) or likewise when moving from near second end (14) to middle portion (16). The widest diameter of interior space (22) is located at the center of middle portion (16). In some other versions, interior space (22) can have a generally consistent diameter along the length of dog toy (10), for instance where toy (10) has an interior space (22) having a square or rectangular shaped cross-section, such that interior space (22) has a three-dimensional shape of a cube or cylinder. In view of the teachings herein, other shapes and/or geometries for interior space (22) will be apparent to those of ordinary skill in the art.

In FIG. 4, elongated member (20) comprises a somewhat square-shaped cross sectional surface (30) across middle portion (16) that has a substantially consistent thickness as elongated member (20) extends along the length of middle portion (16) towards ends (12, 14). In the present example, the thickness of elongated member (20) along middle portion (16) is about 0.6 inches and remains fairly constant along middle portion (16). In other versions, elongated member (20) can have a slightly decreasing thickness along the length of middle portion (16) as elongated member (20) extends either from one end to the other or from a center part of middle portion (16) towards one or both of ends (12, 14). In some versions, the overall shape of toy (10), e.g. spherical, oval, or egg shape, is maintained regardless of whether the thickness or diameter of elongated member (20) remains generally constant along middle portion (16) or whether the thickness or diameter of elongated member (20) changes along middle portion (16).

In an example where toy (10) does not incorporate such a tapered configuration, interior space (22) can have a generally consistent diameter along the length of toy (10), while elongated member (20) has a generally consistent thickness along the length of middle portion (16). Based on the previous described examples, toy (10) defines the shape of interior space (22) based on an interior surface (40) of elongated member (20). Furthermore, changing the thickness of elongated member (20) along the length of toy (10) can alter the shape of interior space (22), while maintaining the shape of toy (10). Still yet, changing the thickness or diameter of elongated member (20) along the length of toy (10) could also be used to alter the shape of toy (10) while maintaining the shape of interior space (22) of toy (10).

Figure 6:
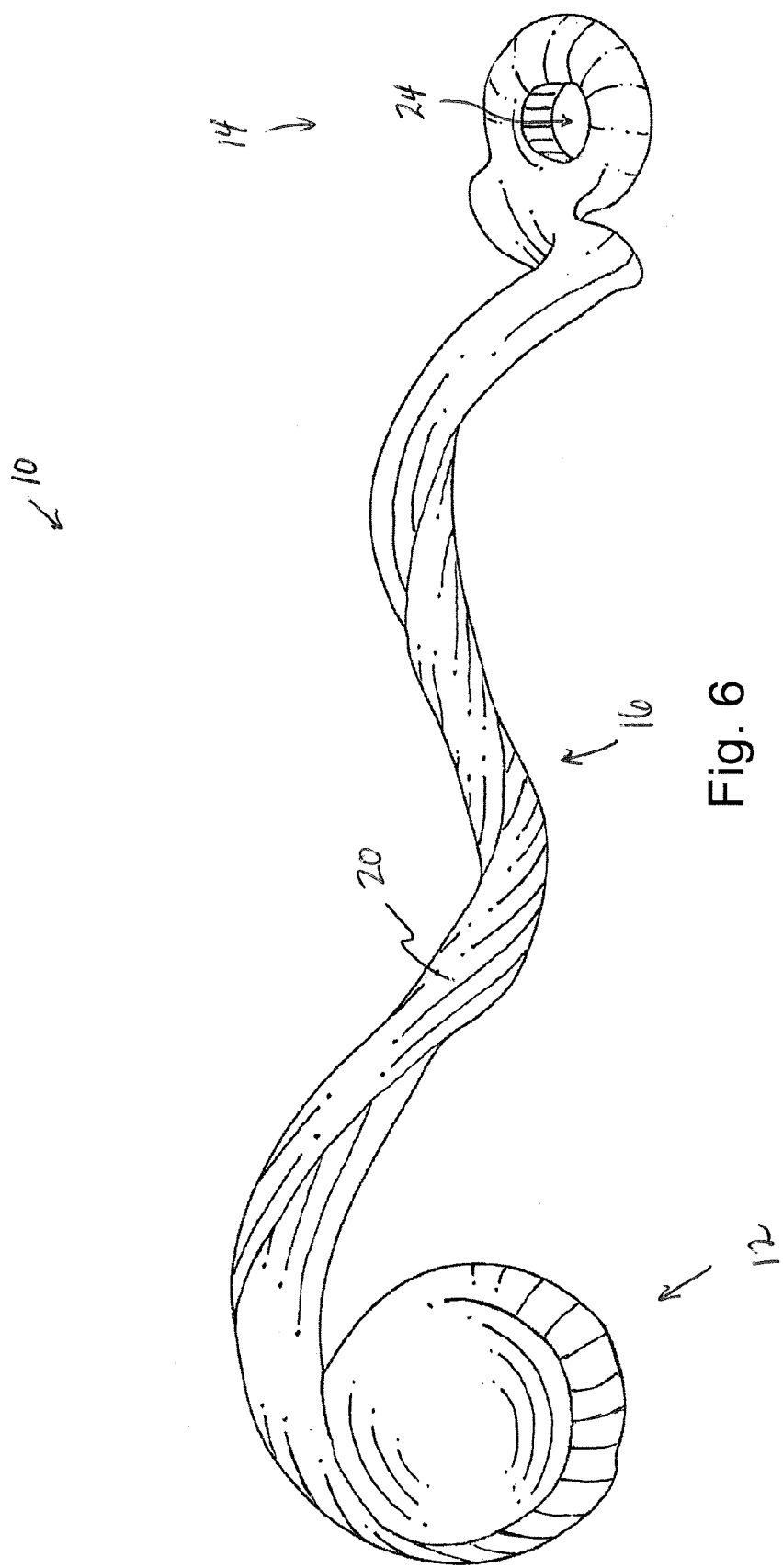
FIG. 6 depicts a perspective view of the pet toy of FIG. 1, shown with the toy stretched or extended.

In one example, interior space (22) extends into the portions defined by first and second ends (12, 14). First and second ends (12, 14) further comprise cross sectional surfaces (32, 34) respectively as shown in FIG. 4. The generally larger size of elongated member (20) at first and second ends (12, 14) compared to along middle portion (16) provides toy (10) with a measure of rigidity at first and second ends (12, 14) that promotes stability yet allows the ability to tug and stretch toy (10) from first or second end (12, 14) into a new shape. In other words, the spiral or coiled shape and dimensions of elongated member (20) along middle portion (16) provide the ability for toy (20) to stretch or extend into a second shape compared to the first shape of toy (10) when an external force is not being applied to toy (10), i.e. pulling or tugging. The second shape for toy (10) can be an elongated form of the first shape which may be spherical as mentioned above. Or the second shape for toy (10) can have an unwound shape or uncoiled shape or configuration where toy (10) takes the form an unwound rope or stretched coil as shown in FIG. 6. Toy (10) is further constructed from a material having sufficient elastic properties or memory such that toy (10) springs back or resiliently returns to its first shape or at-rest shape when the external force applied to toy (10) is removed.

Toy (10) is thus configured to have a first shape when at-rest such that there is not an external force such as pulling or tugging put on toy (10). And toy (10) is further configured to have a second shape when subjected to an external force such as pulling or tugging as the case may be. Furthermore, toy (10) is configured such that the shape of toy (10) changes depending on the degree of external force being applied to toy (10). In other words, toy (10) may stretch a first amount at a first degree of force, and toy (10) may stretch a second amount at a second degree of force. Toy (10) is configured with this shape-changing feature by having a certain material of construction and also by having a certain geometry or shape. For instance, the coiled shape of middle portion (16) provides shape-changing ability. And further, toy (10) can be constructed of a thermoplastic elastomer with resilient properties such that this material of construction also provides shape-changing ability. Thus in the present example, shape-changing ability or stretching ability is achieved by a combination of material of construction and toy's (10) shape or geometry. This combination approach can provide toy (10) with a greater amount of shape-changing ability or stretching ability compared to a toy without such a combination.

In some versions, toy (10) has a length of about 3 inches when at-rest, and can stretch to a length of about 21 inches under sufficient force that can be observed by a pet's pulling and tugging. In some instances, toy (10) can stretch about 7 times its original length. In some instances toy (10) can stretch in length by about 600%. In other versions, the amount of stretch or shape-changing can be more or less. For instance, in some versions, toy (10) can stretch about 4-7 times its original length. In some instances toy (10) can stretch in length by about 300% to about 600%. In still other versions, toy (10) can stretch about 2-4 times it original length. In some other versions, toy (10) can stretch in length by about 100% to about 300%. Still yet, toy (10) can be configured with other amounts of stretch or shape-changing, and such ways to configure toy (10) and the amounts of stretch or shape-changing will be apparent to those of ordinary skill in the art in view of the teachings herein.

In other versions, toy (10) has a length of about 4.5 inches when at-rest, and can stretch to a length of about 21 inches under sufficient force that can be observed by a pet's pulling and tugging. In some instances, toy (10) can stretch about 4.6 times its original length. In some instances toy (10) can stretch in length by about 360%. Still in other versions, toy (10) can stretch about 1.5 times its original length or more. Or toy (10) can stretch about 100% in length or more. Again, in other versions, the amount of stretch or shape-changing can be more or less Another feature of toy (10), and in particular combining the shape or geometry of toy (10) with the material of construction to achieve stretch ability, is that toy (10) is configured to direct stretch in a particular direction. For instance in the present example, stretch is directed along the length of toy (10) due to the configuration of toy (10), and in particular due to the coiled or wound nature of toy (10). In view of the teachings herein, other ways to configure toy (10) to control the direction of stretch will be apparent to those of ordinary skill in the art.

The re-shaping feature and resilient feature of toy (10) also allows for inserting an object into interior space (22), e.g. bully stick, bone, treat, water bottle, or other food item or play article. At the same time, whatever item is positioned within interior space (22) is still accessible through middle section (16) and openings (18, 24). Based on the teachings herein, other ways to configure toy (10) to provide stability and access to interior space (22) when inserting an object will be apparent to one of ordinary skill in the art.

Another feature of toy (10) is that toy (10) is configured to hold an object that is initially larger than the length of toy (10) when toy (10) is in a first position and not under an external force from anything other than the object itself. Then, toy (10) is configured with the ability to change shape as mentioned, and in particular to extend to a new or second length. This new or second length can be greater than the length of whatever object is held by toy (10) and extends through interior space (22). Furthermore, toy (10) is configured to resilient return to its first shape when the external force form anything other than the object itself is removed. By way of example, and not limitation, toy (10) can be stretched to uncoil toy (10) and then a large chew article can be held next to stretched toy (10). When force is reduced and toy (10) resiliently returns to its prior shape, toy (10) reforms around the object or chew article such that the object or chew article is now retained within interior space (22) of toy (10).

Toy (10), in the present example, is constructed of thermoplastic elastomer. The thermoplastic elastomer provides a durable tear resistant and resilient material. Furthermore, as mentioned above, the shape and thicknesses of various cross sectional surfaces of elongated member (20) along the length of toy (10) are configured to provide regions where there is increased rigidity (e.g., at first and second ends (12, 14) where the spiral shape terminates) and regions where there is increased resilient flexibility (e.g., along middle portion (16) where the spiral shape is prevalent with spaces (18) on either side). Other suitable materials for the construction of toy (10) that provide suitable resiliency and durability will be apparent to one of ordinary skill in the art in view of the teaching herein, and may include various rubbers, plastics, and polymeric materials.

In the present example, and not required in all versions, the material used for constructing toy (10) is also dyed to an attractive color and is infused with a scent. For instance, in one version, toy (10) is bright orange in color with a vanilla scent. Other colors and/or scents can be used and will be apparent to one of ordinary skill in the art in view of the teachings herein.

In a first use of toy (10), object (36) is inserted through interior space (22) of middle portion (16) of toy (10) and extends out holes or openings (24, 18). In the present example, object (36) is a bully stick chew item, but other items for object (36) can be used. Such other items have been mentioned previously and will be apparent to those of ordinary skill in the art in view of the teachings herein. With this shown and described configuration, toy (10) protects object (36) increasing life duration of object (36) by making it a challenge for a dog or other type of pet to chew on object (36) or pull object (36) out of or separate object (36) from toy (10) through end (14) configured with opening (24) or anywhere out of openings (18) that connect with or communicate with interior space (22).

In a second use, toy (10) is used without anything inserted within interior space (22). With this configuration, toy (10) allows middle portion (16) to be stretched, e.g., by a dog or other type of pet, by pulling on first and/or second ends (12, 14) of toy (10). Even when toy (10) is stretched into a new shape the resilient features allow toy (10) to return to its original shape after the dog or other type of pet, or human let go of either first and second ends (12, 14) of the toy (10) such that it is no longer being stretched.

As shown and described in some versions herein, toy (10) is in the shape of a sphere. However, other shapes can be used and will be apparent to one of ordinary skill in the art in view of the teachings herein. Furthermore, toy (10) is constructed and designed such that it floats when used in a water environment. This floatable feature of toy (10) is achieved when toy (10) is used with or without object (36) inserted within interior space (22). In view of the teachings herein, other uses for toy (10) will be apparent to one of ordinary skill in the art.

Figure 5:
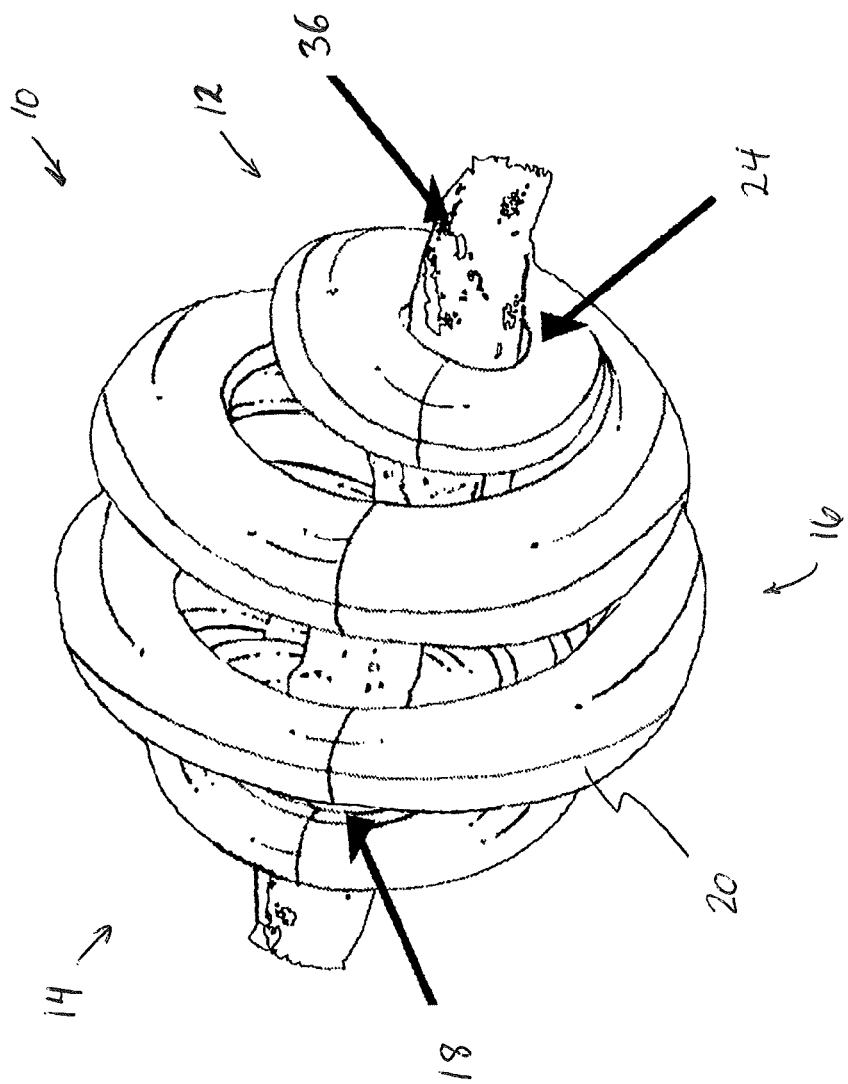
FIG. 5 depicts a perspective view of the pet toy of FIG. 1, shown with openings at both ends, and shown with the pet toy holding a pet chew article.

Referring to FIG. 5, in some versions pet toy (10) can include opening (24) at both ends (12, 14). In some other versions both ends (12, 14) may be closed or sealed such that opening (24) is omitted entirely. In view of the teachings herein, other ways to configure toy (10), and in particular ends (12, 14) of toy (10), will be apparent to those of ordinary skill in the art.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A pet toy comprising a body having a coiled middle portion positioned between a first end and a second end, wherein the body comprises a cross sectional surface that is larger at the first and second ends than at the coiled middle portion, wherein the pet toy comprises a first length, wherein the pet toy is configured to stretch to a second length in response to a force being applied to the pet toy, wherein the coiled middle portion is configured to uncoil in response to the pet toy being stretched.

2. The pet toy of claim 1, wherein the coiled middle portion is configured to return the pet toy to the first length from the second length in response to the force being removed from the pet toy.

3. The pet toy of claim 1, wherein the pet toy is constructed of a resilient material.

4. The pet toy of claim 1, wherein the coiled middle portion is configured to recoil in response to the force being removed from the pet toy.

5. The pet toy of claim 4, wherein the recoiling of the coiled middle portion returns the pet toy to the first length from the second length.

6. The pet toy of claim 1, wherein the coiled middle portion is configured to direct stretch of the pet toy in a specific direction.

7. The pet toy of claim 1, wherein the pet toy comprises an interior space.

8. The pet toy of claim 7, wherein the interior space is configured to hold an object.

9. The pet toy of claim 1, wherein the coiled middle portion comprises an elongate member extending from a first end of the pet toy to a second end of the pet toy.

10. The pet toy of claim 9, wherein the elongate member comprises an outer surface, wherein the outer surface defines a shape of the pet toy.

11. The pet toy of claim 10, wherein the shape of the pet toy comprises a sphere.

12. The pet toy of claim 10, wherein the shape of the pet toy comprises an ellipsoid.

13. The pet toy of claim 9, wherein the elongate member comprises an interior surface, wherein the interior surface defines a shape of an interior space of the pet toy.

14. The pet toy of claim 13, wherein the shape of the interior space comprises a sphere.

15. The pet toy of claim 13, wherein the shape of the interior space comprises an ellipsoid.

16. The pet toy of claim 1, wherein the body comprises a diameter that is larger at the first and second ends than at the middle portion when the pet toy is stretched to the second length.

* * * * *

UNITED STATES PATENT AND TRADEMARK OFFICE
CERTIFICATE OF CORRECTION

PATENT NO. : 9,526,230 B2  
APPLICATION NO. : 14/261503  
DATED : December 27, 2016  
INVENTOR(S) : Stephen Z. Day It is certified that error appears in the above-identified patent and that said Letters Patent is hereby corrected as shown below:

On the Title Page

Inventor field, replace the text "Steven" with --Stephen--.

Assignee field, replace the text "West Harrison, IN" with --West Chester, OH--.

Signed and Sealed this  
Ninth Day of May, 2017

Michelle K. Lee  
*Director of the United States Patent and Trademark Office*